United States Patent [19]
Luraschi

[11] 3,718,413
[45] Feb. 27, 1973

[54] MANUFACTURING PROCESS AND MACHINE FOR PRODUCING AN EXTRUDED THERMOPLASTIC LAMINATE WITH MULTISHAPED VARIEGATION

[76] Inventor: Marisa Luraschi, 21040 Venegono Inferiore, Varese, Italy

[22] Filed: June 29, 1970

[21] Appl. No.: 50,504

[30] Foreign Application Priority Data

July 1, 1969  Italy..............................19037 A/69

[52] U.S. Cl. ..................425/130, 425/131, 264/165
[51] Int. Cl. ............................B29f 1/12, B29f 3/12
[58] Field of Search .....18/2 HA, 13 C, 13 P, DIG. 9, 18/4 B, 5 A, 12 TS, 2 J; 264/165, 171; 425/130, 131, 132

[56] References Cited

UNITED STATES PATENTS

| | | |
|---|---|---|
| 3,039,138 | 6/1962 | Hall et al........................18/12 TS X |
| 2,803,041 | 8/1957 | Hill et al............................18/13 P X |
| 3,081,487 | 3/1963 | Heffner et al............................18/4 B |
| 3,531,828 | 10/1970 | Nouta ...................................18/13 P |

Primary Examiner—Robert L. Spicer, Jr.
Attorney—Fernanda M. Fiordalisi

[57] ABSTRACT

Manufacturing process and machine for producing a thermoplastic laminate, showing specklings with multishaped variegated pattern, characterized in that it is constituted of two or more extruders, connected to a distributing apparatus or die-plate, a pair of cylinders, a knife applied to the frame, a set rollers, constituting a sliding plate and a bench on which projects a guide, supporting a slider, sustaining a feeler or a photoelectric cell, the aforesaid distributing apparatus comprising two or more supply ducts, connected to so many extruders, at least one of said ducts being connected to a cylindrical chamber, provided in the distributing apparatus, inside which rotates a worm, provided peripherally with inclined grooves, said cylindrical chamber being further connected via a set small-sized channels to a portion of a supply duct.

6 Claims, 8 Drawing Figures

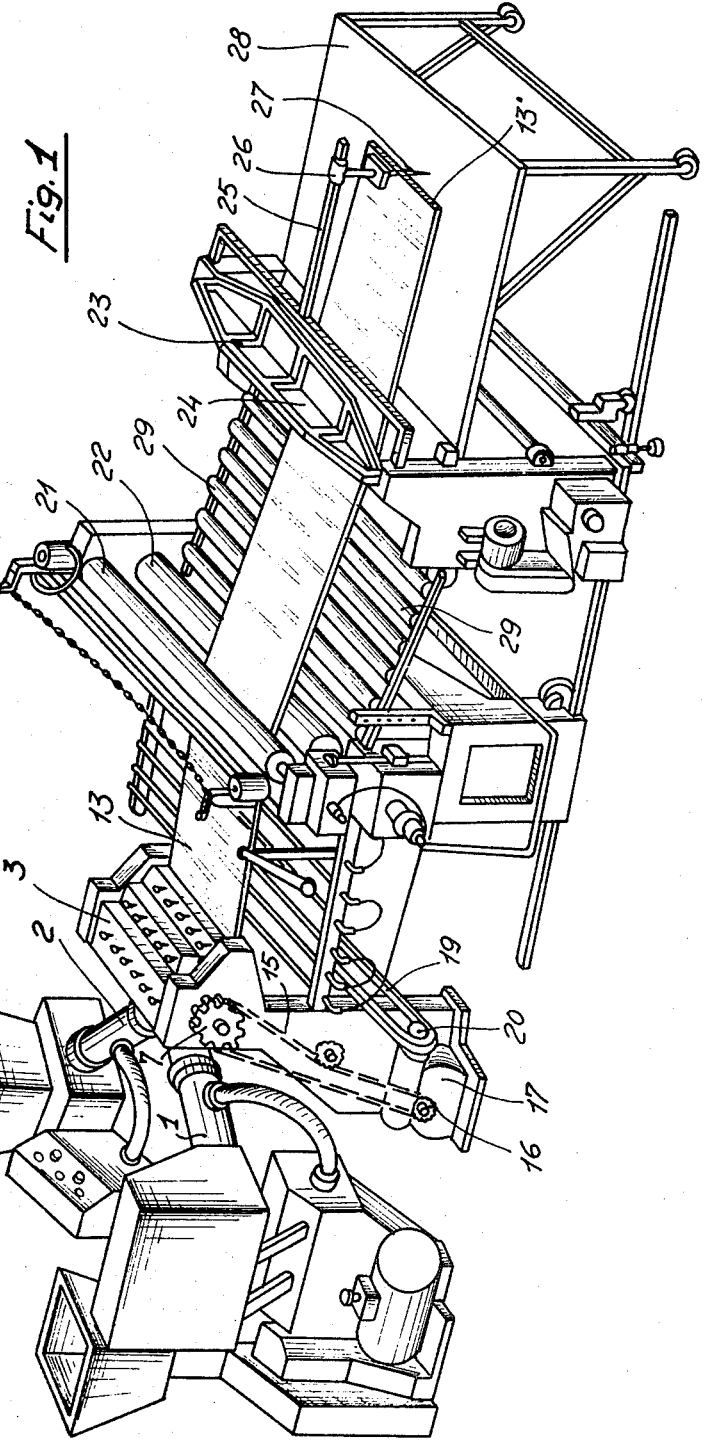

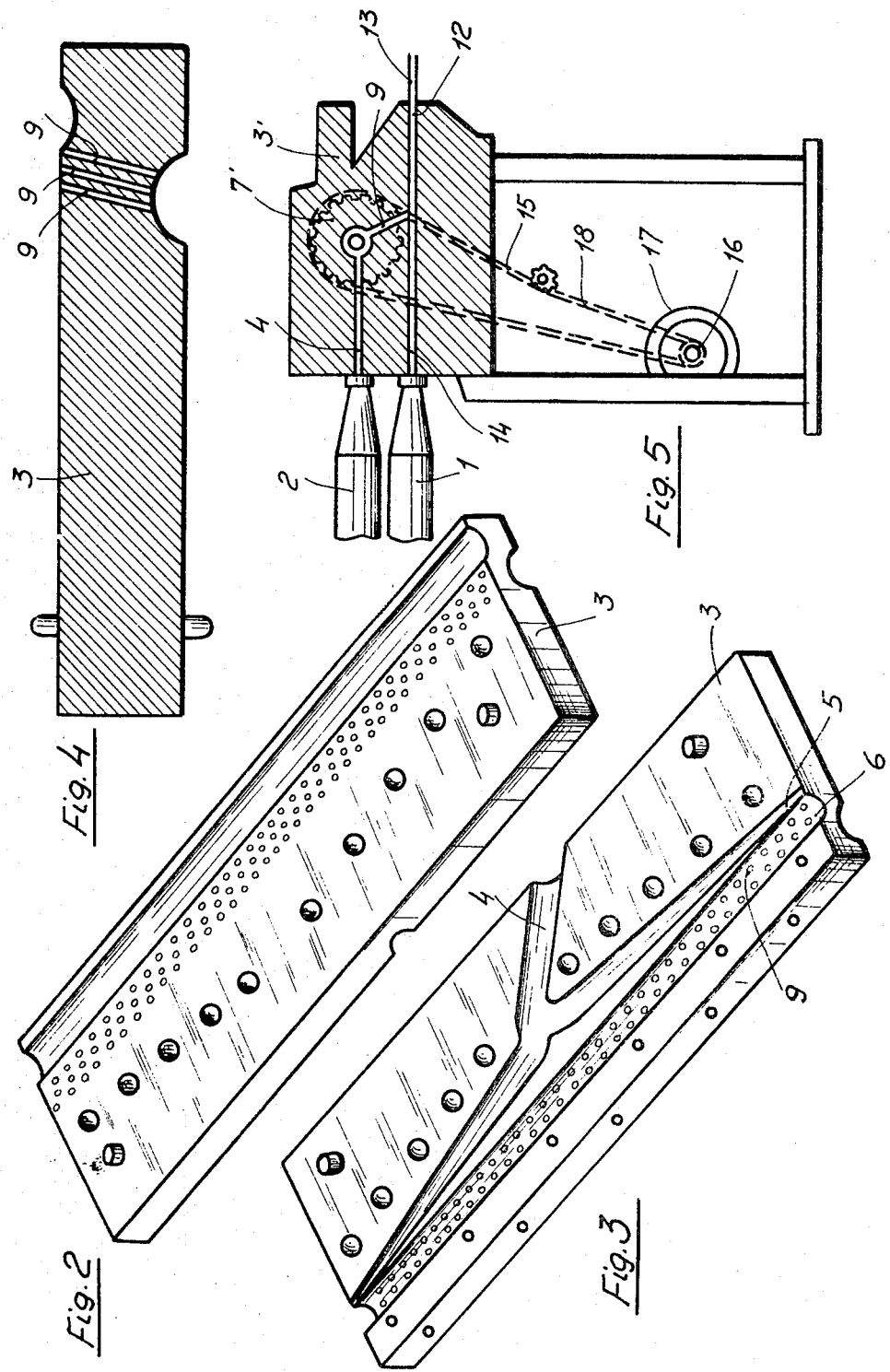

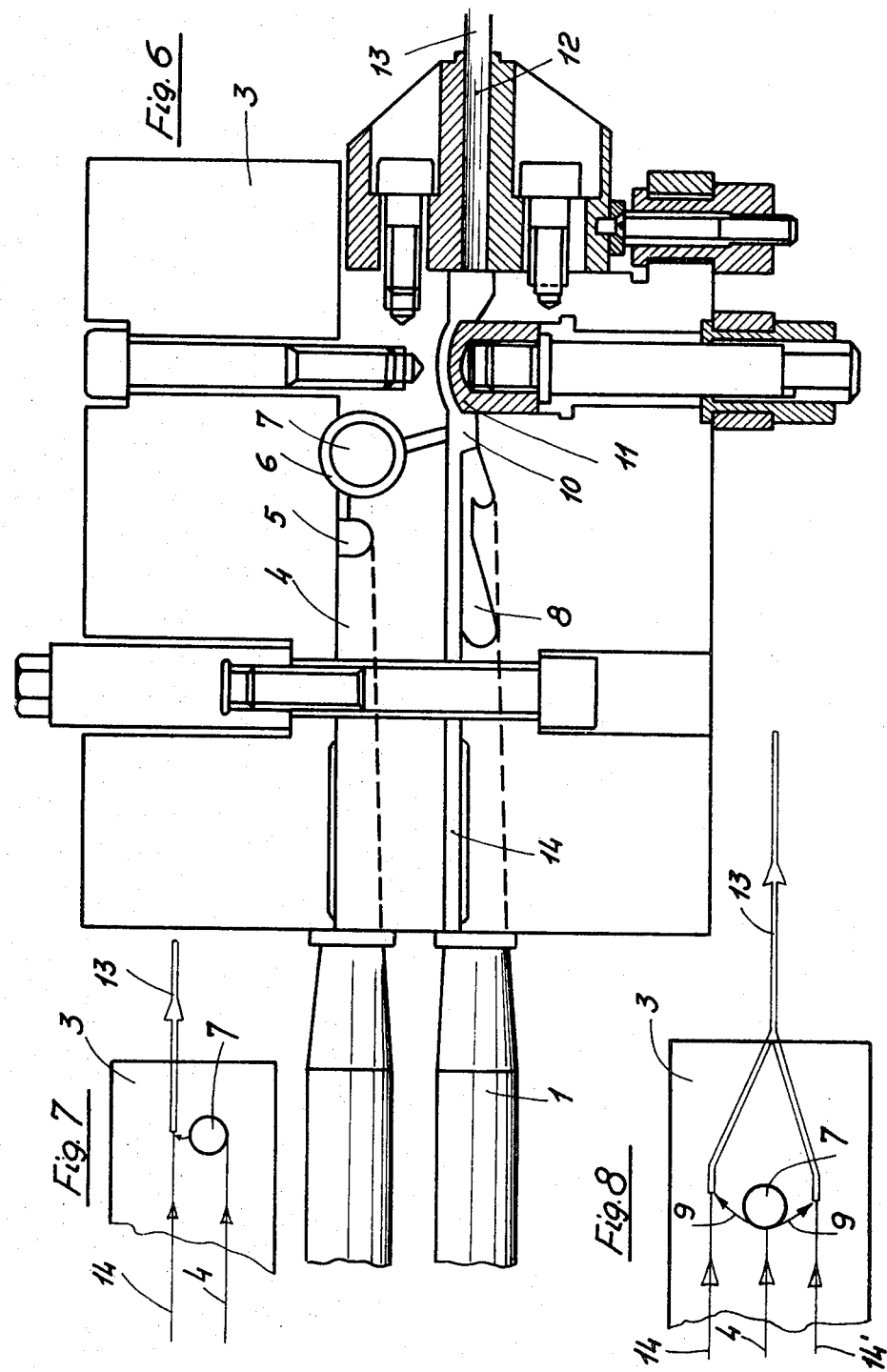

MANUFACTURING PROCESS AND MACHINE FOR PRODUCING AN EXTRUDED THERMOPLASTIC LAMINATE WITH MULTISHAPED VARIEGATION

SUMMARY

Manufacturing process and machine for producing a thermoplastic laminate, showing specklings with multishaped variegated pattern, characterized in that it is constituted of two or more extruders, connected to a distributing apparatus or die-plate, a pair of cylinders, a knife applied to the frame, a set rollers, constituting a sliding plate and a bench on which projects a guide, supporting a slider, sustaining a feeler or a photoelectric cell, the aforesaid distributing apparatus comprising two or more supply ducts, connected to so many extruders, at least one of said ducts being connected to a cylindrical room, provided in the distributing apparatus, inside which rotates a worm, provided peripherally with inclined grooves, said cylindrical room being further connected via a set small-sized channels to a portion of a supply duct.

This invention relates to a manufacturing process and machine for producing a thermoplastic laminate obtained by extrusion and showing multishaped variegation. By the manufacturing process according to the present invention it is thus possible to obtain thermoplastic laminates, showing particular aesthetical effects, which lend themselves to further processing.

Particularly, it is possible to provide thermoplastic laminates, which are suitably adapted to be mechanically treated and which are well suitable for manufacturing spectacle-frames, for example imitating turtle.

Heretofore, in the manufacture of plastic laminates of this kind, the classic discontinued process has been used, comprising the steps of the subsequent casting, composition of the block, hot-pressing and solvents evaporation.

The laminate covered by the present invention is obtained instead through continued extrusion, is integrally constituted over its entire thickness of one single type of plastic material and is free from solvents: this resin may be the cellulose acetate containing a different percentage of plasticizer or possibly other thermoplastic material, such as the cellulose acetate butyrate, methylmetacrylate, shock-proof polystyrene, acrylonitrile-styrene-butadiene terpolymers and generally the so called thermoplastic resins.

The manufacturing process of the laminate according to this invention consists in continuously conveying by means of two or more screw extruders distinct flows of molten material having a different coloring into a particular die-plate.

One or more flows of resin constitute the bottom or support of the laminate; one or more flows of the thermoplastic material itself, having however a different coloring from the former flows, are injected to the inside or over the surface of the bottom or support with the operation of the die-plate and constitute the multishaped variegation pattern. It should be stressed here that this distribution of the flow, having a variegation effect occurs "spotwise" or by slits, being suitably distributed over the width of the bottom or support laminate and at different height, thereby enabling to obtain the most diversified plurality of shapes.

These and other features of the method and machine according to the present invention could be better understood with the aid of the various figures on the accompanying drawings, in which:

FIG. 1 shows the machine according to this invention in a perspective side view, FIGS. 2 and 3 represent two different views of the main opposite surfaces of a special die-plate, FIG. 4 shows a view of the die-plate, represented in FIG. 2, but cut with a vertical plane normal to the longitudinal axis of the die-plate itself, FIG. 5 shows a sectional side view of a detail of the machine according to this invention, comprising the end portions of two extruders and a special die-plate, provided with ducts through which the plastic materials are conveyed, one of said ducts conveying one flow of plastic material, designed to form a bottom lamellar surface, the other duct being connected to a cylindrical hollow space, inside which there is housed a worm or screw, which is driven by means of a chain through a motor and provided with grooves or channels being suitably inclined. Through said grooves, the plastic material, conveyed by the upper extruder, is injected under pressure into a series of orifices, connected to the lower portion of the die-plate, whereat is extruded the bottom or support of the plastic laminate, which thus receives a variegation effect.

FIG. 6 shows a side view of the special die-plate, applied to the machine according to this invention, and cut with a vertical and parallel plane to the extrusion direction of the variegated plastic laminate, FIGS. 7 and 8 show two schematical views, illustrating the process according to this invention in case the laminate is produced with 2 or 3 flows, respectively, of plastic material.

In the formal case, as exemplified in FIG. 7, there are two flows, one of which has the function of constituting the "bottom" or "support", whereas the other one constitutes the multishaped variegation pattern over one or more layers. In the case as exemplified in FIG. 8, the production of the laminate takes place by using three flows of thermoplastic resin, two of which have the function of forming the "bottom" or "support", whereas the third flow forms the multishaped variegation pattern over two or more layers.

Referring now to the numeral symbols as used on the accompanying drawings, the manufacturing process according to this invention provides the utilization of a machine, constituted of two or more extruders 1 and 2.

The extruder 1, in the specific case as illustrated in FIGS. 2 and 6, conveys the plastic materials into the duct 4, connected to a distribution duct 5, being adjacent relative to a cavity 6, inside which there is housed a worm or screw 7.

The latter is provided with a series of suitably inclined grooves, provided at the surfaces of the screw 7.

As may be easily understood from perusal of the FIGS. 1 and 5, it is rotated by a (not shown) motor, which deliver its motion to a belt 19.

The latter rotates, in turn, a pulley 20, fitted to a speed reducer 17, provided with a secondary reduction shaft, made integral with a pinion 16.

Said organ transmits its own motion to a chain 15, driving the pinion 7', made integral with the screw 7.

Said screw 7 conveys at a high pressure and at regular time intervals into the various orifices, channels or slits 9 flows of plastic material, which are mixed with the plastic "bottom" lamellar layer, which is extruded by the extruder 1. The machine according to this invention is provided besides with two or more extruders 1 and 2 with a distributing apparatus or die-plate 3 from which moves out the laminate 13 provided with multishaped variegation effect. Said laminate 13 passes then between two cylinders 21 and 22 and is conveyed onto a set of rollers 29, constituting a sliding plane towards the bench 28.

Above the latter there is applied a guide supporting a slider 26, which contains a feeler or a photoelectric cell 27. The latter organs, when they are reached by an end of the thermoplastic laminate sheet 13, control the actuation of a knife 24, supported by a frame 23.

In the example, shown in FIGS. 1, 5, 6 and 7, there are conveyed two flows designated 4 and 14 of the same plastic material but having a different coloring.

The flow 14 constitutes the bottom or support of the laminate, in the desired thickness and required transparent or translucent color.

The flow 4 which the mechanical rotary device 7 provides to inject stopwise or by slits into the inside or surface of the bottom, at an alternating and preset supply frequency, constitutes the multishaped variegated pattern of the laminate over one or more layers in the required transparent, translucent or matt color.

It should be understood here that the bottom flow 14 and the variegated effect flow 4 identify at the outlet of the die-plate 3 into one single laminate 13.

In the example as schematically illustrated in FIG. 8, there are conveyed to the die-plate three flows 4, 14 and 14' of the same plastic material, but having a different coloring. The flows 14 and 14' constitute the bottom or support of the laminate in the required thickness and desired transparent or translucent color.

The flow 4, which the mechanical rotary device 7 provides to simultaneously inject spotwise to the inside or the surface of the two bottom layers at at alternating and preset supply frequency, constitutes the multishaped variegated pattern of the laminate over two or more layers in the required transparent, translucent or matt color.

It should be noted here that the bottom and variegation effect flows identify at the outlet of the die-plate into one single laminate 13.

In the specific case of the process according to the present invention, it provides for the production of the laminte by two flows, one of which 14 has the function of bottom or -support, whereas the other one 4 constitutes the multishaped variegated pattern, over one or more layers.

In such specific case, there are obtained differing effects by separately changing the relative speed of the two flows or separately changing the speed or the design or even the rotating direction of the mechanical rotary device.

Other variegation effects, consisting of multishaped variegation effects are obtained by simultaneously changing the three parameters of the aforementioned device.

It is further possible to obtain different effects by inserting over the path of the laminate, inside the die-plate and after the injection of the variegation effect flow, suitable fixed or movable devices, provoking movements or slidings with different pattern of the variegated flow.

In case instead the laminate is produced by three thermoplastic resin flows, two of which have the function of bottom or support, whereas the third flow constitutes the multishaped variegated pattern over two or more layers, different aesthetical effects may be obtained in different manners.

For example, it is possible to reverse the three distinct flows either by separately changing the relative speeds of the three flows or by suitably changing the speed and/or the design and/or the rotating direction of the mechanical rotary device.

It is further possible to change the three parameters of the aforementioned device or it is possible to insert over the path of the laminate, inside the die-plate and after the injection of the variegation effect flow suitable fixed or movable devices, provoking movements or slidings with different pattern of the variegated flow.

Furthermore, according to the process of this invention, it is possible to produce the laminate by more than three thermoplastic resin flows by doubling or combining the aforesaid schemes.

In all the above-described cases, the particular feature of the process according to this invention resides in the fact that the extruded thermoplastic laminate is obtained by a continuous process as a unit block, consisting namely of one single resin without solvents, immediately ready for use and permits to ensure a multishaped variegation effect, being in all similar to that obtained through the traditional discontinued processes.

What we claim is:

1. An apparatus for the production of a thermoplastic laminate with a multishaped variegated pattern, from at least two flows of molten material, which comprises at least two extruders, each of said extruders being provided with a duct through which the material is conveyed, the material from the first extruder forming the bottom of the laminate, the material from the second extruder forming the multishaped variegated pattern, means for varying the relative speed of the extruders, means for injecting the second material into a plurality of inclined grooves at a predetermined frequency through a rotating device, means for actuating the rotating device, said rotating device being located in a cavity adjacent the duct connected with said second extruder, and means for combining said two materials into a single laminate.

2. The apparatus according to claim 1 wherein said rotating device is a screw provided with a series of peripherally inclined grooves at the surface.

3. The apparatus according to claim 1 which comprises at least three extruders, the material from at least one extruder, forming the bottom of the laminate, and the material from at least one extruder forming the variegated pattern.

4. The apparatus according to claim 2 which is provided with a speed reducer for adjusting the speed of said rotating device.

5. The apparatus according to claim 2 which is provided with means for changing the direction of rotation of said screw.

6. The apparatus according to claim 1 which is provided with a set of cylinders and a set of rollers for passing the laminate after the materials from the first and second extruders have been combined, and which is provided with knifing means after said cylinders and rollers, said knifing means being responsive to a photoelectric cell.

* * * * *